(12) United States Patent
Poncet et al.

(10) Patent No.: US 8,562,838 B2
(45) Date of Patent: Oct. 22, 2013

(54) METHOD FOR TREATING MINERAL SLUDGE ABOVE GROUND USING POLYMERS

(75) Inventors: Frédéric Poncet, Saint Cyprien (FR); Nicolas Gaillard, Saint Etienne (FR)

(73) Assignee: SNF S.A.S., Saint Etienne (FR)

( * ) Notice: Subject to any disclaimer, the term of this patent is extended or adjusted under 35 U.S.C. 154(b) by 555 days.

(21) Appl. No.: 12/588,570

(22) Filed: Oct. 20, 2009

(65) Prior Publication Data
US 2010/0105976 A1  Apr. 29, 2010

(30) Foreign Application Priority Data
Oct. 23, 2008  (FR) ...................................... 08 57212

(51) Int. Cl.
B01D 21/01 (2006.01)
B03D 3/00 (2006.01)
C02F 1/52 (2006.01)
C02F 1/00 (2006.01)
B01D 37/00 (2006.01)

(52) U.S. Cl.
USPC ........... 210/732; 210/723; 210/733; 210/734; 210/735; 210/747.1; 210/770

(58) Field of Classification Search
USPC ........................................................ 210/710
See application file for complete search history.

(56) References Cited

U.S. PATENT DOCUMENTS

| | | | |
|---|---|---|---|
| 3,423,313 A * | 1/1969 | Messer .......................... | 210/734 |
| 4,347,140 A | 8/1982 | Condolios et al. | |
| 4,959,432 A | 9/1990 | Fan et al. | |
| 5,032,295 A | 7/1991 | Matz et al. | |
| 5,788,867 A * | 8/1998 | Pearson ......................... | 210/733 |
| 5,961,840 A * | 10/1999 | Ryles et al. .................... | 210/734 |
| 6,821,440 B2 * | 11/2004 | Gallagher et al. ............. | 210/732 |
| 7,306,406 B2 * | 12/2007 | Putnam et al. ................. | 405/264 |
| 7,754,086 B2 * | 7/2010 | Whittaker et al. ............. | 210/727 |
| 7,875,188 B2 * | 1/2011 | Dymond et al. ................ | 210/710 |
| 7,901,583 B2 * | 3/2011 | McColl et al. ................. | 210/710 |
| 2008/0196851 A1 | 8/2008 | Hund et al. | |

FOREIGN PATENT DOCUMENTS

| | | |
|---|---|---|
| EP | 0 819 651 A1 | 1/1998 |
| FR | 2 880 901 A1 | 7/2006 |

OTHER PUBLICATIONS

The French Search Report for corresponding French application No. 0857212; two pages, (2009).

* cited by examiner

Primary Examiner — Christopher Upton
Assistant Examiner — Clare Perrin
(74) Attorney, Agent, or Firm — Vorys, Sater, Seymour and Pease LLP; Susanne M. Hopkins

(57) ABSTRACT

Provided is a method for treating sludge from the mining or mineral industry, including before above-ground spreading, contacting the sludge with a flocculating agent that is a water-soluble, organic polymer having a molecular weight of from 5,000,000 to 25,000,000 g/mol and an anionicity of from 10 to 40 mol %, to produce contacted sludge, wherein the water-soluble organic polymer includes at least one anionic monomer having a carboxylic function or having a sulfonic acid function, at least one non-ionic monomer, and optionally one or more cationic monomers, where the flocculating agent is branched, and has from 0.02 to 2 mol % hydrophobic monomers.

12 Claims, No Drawings

METHOD FOR TREATING MINERAL SLUDGE ABOVE GROUND USING POLYMERS

This invention concerns a method for treating mineral sludge by using polymers. Among other uses, it can be applied to the treatment of effluents from the mining or mineral industry, including the treatment of bituminous sand residues. It can also be applied to dredging processes or public works operations which produce large amounts of mineral sludge. In both cases, the objective is to dry and solidify the sludge above ground.

While some forms of coarse sludge (sand, gravel, etc.) can be dried and used to reconstitute usable soil, in agriculture for example, most effluents containing large amounts of suspended matter in colloidal form (clay, silt, etc.) are particularly stable and hard to decant and cannot be dried.

For a long time, and even now, mineral sludge produced by physical or chemical ore treatment methods were stored above ground in retention lagoons or embankments in semi-liquid form. One of the first methods used consisted in pumping flocculated sludge over a certain distance and depositing it on the ground for drying by evaporation. However, this method requests very large surfaces for the sludge spreading owing to:
  the very low angle of slope for runoff,
  the breack of the flocs by hydrotransport,
  and the very low sludge porosity which doesn't allow the sludge drying for thickness exceeding few centimeters,
resulting in a so-called soft sludge structure, with a more or less dry surface crust covering a "colloidal layer", making the spreading surface definitively unusable. These storage areas cannot bear the weight of animals, pedestrians or vehicles. Stored in this way, the sludge forms risk areas over the long term, notably in the sludge basins, if the dikes break.

This problem notably became clearly important in the case of the phosphate mines in Florida, where fairly large lagoons were accumulated, with each washing releasing two million tons of sludge a year on average. It was common to reach depths of 15 meters of deposits with a sludge concentration around 25% over the long term, with no bearing capacity and therefore presenting a real danger in case of rupture.

As the traditional storage solutions described above are ill-suited or even dangerous, more and more national regulations have been issued forbidding abandoning these zones. The regulations also call for an obligation to rehabilitate such sites, i.e. treating and consolidating, or requiring strict authorizations more and more difficult to fulfil.

In 1979-1980 Alsthom Atlantique and SNF (U.S. Pat. No. 4,347,140) developed a flocculation system (super-flocculation) in several steps specially designed for treating the clay lagoons from phosphate production in Florida.

This super-flocculation (over-flocculation) in the piping enables the sludge to form a flow slope so it can be stored above ground rather than in a holding tank. The water released from the over-flocculated sludge was recycled in a peripheral trench for re-pumping. It was also demonstrated that a layer of crushed rock placed under the storage area enabled the interstitial water to drain, sharply reducing drying time. Likewise, adding the flocculating agent in a plurality of points improved its effectiveness and partially reduced consumption.

The first embodiments of super-flocculation were developed in Japan and France. We can notably mention the dredging of the container ship port at Port de Bouc and Fos sur Mer. The method applied consisted, in a first step, in conditioning the sludge (either from a phosphate washing plant or from dredging lagoons where it had been stored) with flocculating agents in a settling tank or in a settling tank and then a thickener. The thickened sludge was then pumped to an above-ground area, where it was disposed after adding an additional amount of an organic flocculating agent in a solution at one or more points in the piping.

At the same time, some tests injecting the flocculating agent from a pressurized vessel incorporated into the piping provided a clear but very limited improvement to the system.

While it is innovative, the Alsthom method has several disadvantages:
  the need to dilute the flocculating agent (usually to less than 1 g/l) so that the mixture with the sludge flow can be achieved in a few seconds' time, which increases the sludge volume by 30 to 40%;
  furthermore, given the pumping speed usually applied in the piping (approximately 2 to 3 m/sec), a heavy overdosage of the flocculating agent is needed to keep the flocs from being destroyed as they form.

Subsequent patents have re-described this method, modifying certain conditions (or not), notably such as injecting powdered polymers directly into the suspension, whose only effect is to increase polymer consumption. Polymers modified by copolymerization or branching are usually proposed, but without any industrial result.

Likewise, the treatment of bituminous sand residues has recently become an issue in Canada (Athabaska). As the quantity of bitumen (heavy oil) trapped in the sand is small, approximately 2 to 10%, large quantities of sand and clay have to be extracted to retrieve the oil by steam heating or other similar processes. The sands are then separated by cycloning and the clays, after a thickening stage, are stored in huge basins where they cannot be dried.

Canadian regulations today forbid or limit the opening of new basins. It was therefore necessary to find a way to dry this sludge above ground in order to restitute land on which trees could be planted. The recommended method consists in dredging the basins, followed by flocculation and above-ground storage. Despite major laboratory and industrial tests, this treatment has been a failure.

The invention solves all the difficulties mentioned above.

The purpose of this invention is therefore to develop a method and polymers for treating effluents from the mining or mineral industry for subsequent drying and solidification above ground, so that the storage site becomes usable again.

According to the invention, it was surprisingly found that the use of a specific polymer according to the invention significantly improved the drying and the solidification of the fine solid particles contained in the sludge when storing it above ground with a view to rehabilitating the surfaces used.

The subject of the invention is therefore firstly a method for treating sludge from the mining or mineral industry, according to which the sludge is placed in contact with a flocculating agent before being spread above ground.

The method is characterized in that the flocculating agent is a water-soluble organic polymer with a molecular weight between 5,000,000 and 25,000,000 g/mol and which presents an anionicity of between 10 and 40 mol % and comprises:
  at least one anionic monomer having a carboxylic function or having a sulfonic acid function,
  at least one non-ionic monomer,
  and possibly one or more cationic monomers,
  and is characterized in that:
  it is branched,
  and it has between 0.02 and 2 mol % hydrophobic monomer(s).

In a known manner, the polymer is branched. As is known, a branched polymer is a polymer that has branches or groups on the main chain, generally laid out on the same plane. Branching could preferably be performed during (or possibly after) polymerization, in the presence of a branching/crosslinking agent and possibly a transfer agent. Below is a non-exhaustive list of branching agents: methylenebisacrylamide (MBA), ethylene glycol diacrylate, polyethylene glycol dimethacrylate, diacrylamide, cyanomethyl acrylate, vinyloxyethyl acrylate or methacrylate, triallylamine, formaldehyde, glyoxal, compounds of the glycidyl ether type such as ethylene glycol diglycidyl ether, or epoxies or any other method known to the person skilled in the art, producing crosslinking.

According to the invention, the flocculating agent is added to the sludge at a concentration between 50 and 1500 g per ton of solids, depending on the nature and the composition of the sludge to be treated.

In practice, contact time between the sludge and the flocculating agent is between 1 and 10 minutes, advantageously between 2 and 5 minutes.

According to another characteristic, the sludge flow angle at the time of spreading is preferably between 8 and 20% (i.e. difference of level over 100 meters horizontally).

Surprisingly, only the use of a polymer according to the invention both significantly decreases consumption of the flocculating agent compared with a conventional flocculating agent as described in the literature and sharply increases the sludge flow angle, which is usually between 2 and 7% and, in the case of the invention reach 8 to 20%.

We also observe that the steeper the slope, the weaker the interstitial water and the faster the drainage despite the pressure produced by the depth of the sludge.

Beyond the aforementioned provisions, the invention includes other embodiments.

Among these, we can mention, non-exhaustively:
 prior addition of mineral loads, whether dehydrating or not, such as sand, lime or calcium sulfate, directly into the sludge in the basin, lagoon or piping;
 adding the flocculating agent at 2 points in the feed pipe, or the use of 2 types of flocculating agents, at least one according to the invention, separately or in a mixture, during the sludge treatment process.

The main advantages of the invention are:
 a sharp decrease in the consumption of flocculating agents; we notably observe that the polymer mixes with the sludge more homogenously, probably due to its branching which reduces the adsorption speed,
 a significant improvement in the sludge's drying and solidification,
 very high adaptability to the constraints related to the nature of the sludge being treated (in terms of composition: amounts of fines/sands, specific surface, etc.), the flow rate and the conditions at the storage site itself (no electricity, difficult access, etc.),
 and making it possible to separate residual oil (when it is present) which is desorbed from the sludge.

Typically, and without limitations, the sludgy effluents (also called slurry, sludge, pulp) from the mining and/or mineral industry treated according to the invention come from dredging processes, public works operations, effluents from ore extraction (coal, alumina, platinum, phosphate, iron, diamonds, gold, copper, etc.), bituminous sand or any other type of aqueous sludge made up of clay or silt.

According to the invention, the flocculating agents used include all types of water-soluble anionic organic polymers, including amphoteric polymers.

In practice, the polymer used comprises:
 a/ at least one monomer selected from the anionic monomers having a carboxylic function (e.g. acrylic acid, methacrylic acid, and their salts, etc.) or having a sulfonic acid function (e.g. 2-acrylamido-2-methyl propane sulfonic acid (AMPS) and their salts, etc.);
 b/ and at least one monomer selected from the non-ionic monomers: acrylamide, methacrylamide, N-vinyl pyrrolidone, vinyl acetate, vinyl alcohol, acrylate esters, allyl alcohol, N-vinyl acetamide, N-vinyl formamide;
 c/ and possibly one or more cationic monomers: we can notably mention non-exhaustively, dimethylaminoethyl acrylate (DMAEA) and/or dimethylaminoethyl methacrylate (DMAEMA), quaternized or salified, diallyldimethyl ammonium chloride (DADMAC), acrylamidopropyltrimethylammonium chloride (APTAC) and/or methacrylamidopropyltrimethylammonium chloride (MAPTAC).

combined with:
 d/ at least one hydrophobic monomer preferably selected from the group including—(meth)acrylic acid esters with an alkyl, arylalkyl and/or ethoxylated chain,—derivatives of (meth)acrylamide with an alkyl, arylalkyl or dialkyl chain,—cationic allyl derivatives,—anionic or cationic hydrophobic (meth)acryloyl derivatives,—or anionic and/or cationic monomers derivatives of (meth) acrylamide bearing a hydrophobic chain,
 e/ the polymer being branched with a branching/crosslinking agent preferably selected from the group including methylene-bis-acrylamide (MBA), ethylene glycol diacrylate, polyethylene glycol dimethacrylate, diacrylamide, cyanomethyl acrylate, vinyloxyethyl acrylate or methacrylate, triallylamine, formaldehyde, glyoxal, compounds of the glycidyl ether type such as ethylene glycol diglycidyl ether, or epoxies.

Obviously, the following examples are only given to illustrate the subject of the invention, which is in no way restricted to them.

EXAMPLES 1 TO 6

Polymer Preparation

In a 1-L reactor equipped with agitator, a thermometer and a nitrogen inlet, are placed:

x mol % acrylamide (AM)

y mol % acrylic acid (AA)

z mol % hydrophobic monomer, to obtain a percentage of active ingredients at 30% and in which the sum of x, y and z is equal to 100 mol %. A surfactant can be added to improve solubilization of the hydrophobic monomer.

The solution is first cooled, neutralized with soda and then degassed under a nitrogen flow. Polymerization is then initiated using a redox couple (initiator). The gel obtained after polymerization is then grinded and dried in a drying oven to obtain a powder.

The different polymers prepared according to the above method are listed in the table below:

| Example | Crosslinking agent | | Hydrophobic monomer | | Solubility on a 200-μm grid | UL viscosity (cps) |
|---|---|---|---|---|---|---|
| 1 | TAA | 40 ppm/ monomer | DMAPMA BrC12 | 0.10 mol % | 2 points 3 μpoints | 5.30 |
| 2 | MBA | 2 ppm/ monomer | EHA | 0.25 mol % | 1 points 1 μpoints | 4.81 |
| 3 | MBA | 3 ppm/ monomer | DMAPMA BrC12 | 0.10 mol % | 1 points 1 μpoints | 4.61 |
| 4 | TAA | 40 ppm/ monomer | DAAMe BrC12 | 0.25 mol % | 5 μpoints | 5.65 |
| 5 | / | / | DAAMe BrC12 | 0.25 mol % | 1 point, 4 μpoints | 5.75 |
| 6 | MBA | 2 ppm/ monomer | / | / | 1 point 5 μpoints | 4.71 |

DAAMe BrC12: N,N-diallyl-N-methyl-N-dodecyl ammonium bromide
DMAPMA BrC12: N-methacrylamidopropyl-N,N-dimethyl-N-dodecyl ammonium bromide
EHA: ethylhexylacrylate
TAA: triallylamine
MBA: methylenebisacrylamide

EXAMPLE NO. 7

Clay sludge from a waste storage lagoon are transported by dredging at a pumping rate of 250 m$^3$/h with an average concentration of 400 to 500 g/l. The sludge is transported approximately 2 km and treated with an anionic flocculating agent (AM/AANa 70/30, molecular weight: 18 million g/mol) with a concentration of 5 g/L.

This solution is fed into the sludge feed pipe at one point or two points in quantities ranging from 500 g to 1,500 g per ton of solids.

Generally, the sludge at the pumping tube outlet has a colloidal structure, a soft appearance and a very low flow slope (approximately 1% after pumping is stopped). Furthermore, we can observe that there is very little water runoff from the sludge. From the viewpoint of structure and hardness, very little difference can be seen between the pumped sludge and the flocculated sludge.

EXAMPLE NO. 8

Under the same conditions as example 7 using the polymer from example 1. The flocculating solution is added into the sludge feed pipe at one or two points at a short or medium distance (200 m) from the pouring point in a quantity ranging from 500 g to 1,500 g per ton of solids.

At the pouring point, the very clear runoff water containing 3-5% oil is released from the sludge and immediately after pumping stops has a concentration of 650 g/L. After 15 days at an average outside temperature of 10° C., surface cracking is such that it has the appearance of rubble that can be handled to form piles.

EXAMPLE NO. 9

Under the same conditions as example 7 using the polymers from examples 2, 3 and 4.

During these tests, we observed that the more branched substances appear to give optimum results when injected as close as possible to the outlet point.

EXAMPLE NO. 10

Under the same conditions as example 7 using the polymers from examples 5 and 6. The result is very slightly superior to that obtained when using a standard polymer.

The invention claimed is:

1. A method for treating sludge from the mining or mineral industry, comprising:
   before above-ground spreading of a sludge, contacting the sludge with a flocculating agent that is a water-soluble organic polymer having a molecular weight of from 5,000,000 to 25,000,000 g/mol and an anionicity of from 10 to 40 mol %, to produce a contacted sludge, wherein the water-soluble organic polymer comprises
      at least one anionic monomer having a carboxylic function or having a sulfonic acid function,
      at least one non-ionic monomer, and
      optionally one or more cationic monomers,
   wherein the flocculating agent is branched, and has from 0.02 to 2 mol % hydrophobic monomers, and
   the hydrophobic monomers comprise one or more members selected from the group consisting of a (meth)acrylic acid ester with an alkyl and ethoxylated chain; an anionic or cationic hydrophobic (meth)acryloyl derivative; and an anionic and/or cationic derivative of (meth)acrylamide bearing a hydrophobic chain.

2. The method of claim 1, wherein the flocculating agent is added to the sludge at a concentration of from 50 to 1500 g/per ton of solids.

3. The method of claim 1, wherein contacting is carried out for a period of time of from 1 to 10 minutes.

4. The method of claim 1, wherein contacting is carried out for a period of time of between 2 to 5 minutes.

5. The method of claim 1, further comprising spreading the contacted sludge above-ground.

6. The method of claim 5, wherein spreading is at a sludge flow angle of from 8 to 20%.

7. The method of claim 1, wherein the anionic monomers having a carboxylic function are selected from the group consisting of an acrylic acid, a methacrylic acid, and their salts; the anionic monomers having a sulfonic acid function are selected from the group consisting of 2-acrylamido-2-methyl propane sulfonic acid (AMPS) and their salts.

8. The method of claim 1, wherein the non-ionic monomers are selected from the group consisting of acrylamide, methacrylamide, N-vinyl pyrrolidone, vinyl acetate, vinyl alcohol, acrylate esters, allyl alcohol, N-vinyl acetamide, and N-vinyl formamide.

9. The method of claim 1, wherein the cationic monomers comprise one or more members selected from the group consisting of dimethylaminoethyl acrylate (DMAEA); dimethylaminoethyl methacrylate (DMAEMA), quaternized or salified; diallyldimethyl ammonium chloride (DADMAC); acrylamidopropyltrimethylammonium chloride (APTAC); and methacrylamidopropyltrimethylammonium chloride (MAPTAC).

10. The method of claim 1, wherein the water-soluble organic polymer further comprises a branching/crosslinking agent.

11. The method of claim 10, wherein the branching/crosslinking agent is selected from the group consisting of methylenebisacrylamide (MBA), ethylene glycol diacrylate, polyethylene glycol dimethacrylate, diacrylamide, cyanomethyl acrylate, vinyloxyethyl acrylate or methacrylate, triallylamine, formaldehyde, glyoxal, and a glycidyl ether compound.

12. The method of claim 10, wherein the glycidyl ether compound is selected from the group consisting of ethylene glycol diglycidyl ether and an epoxy.

* * * * *